Figure 1:
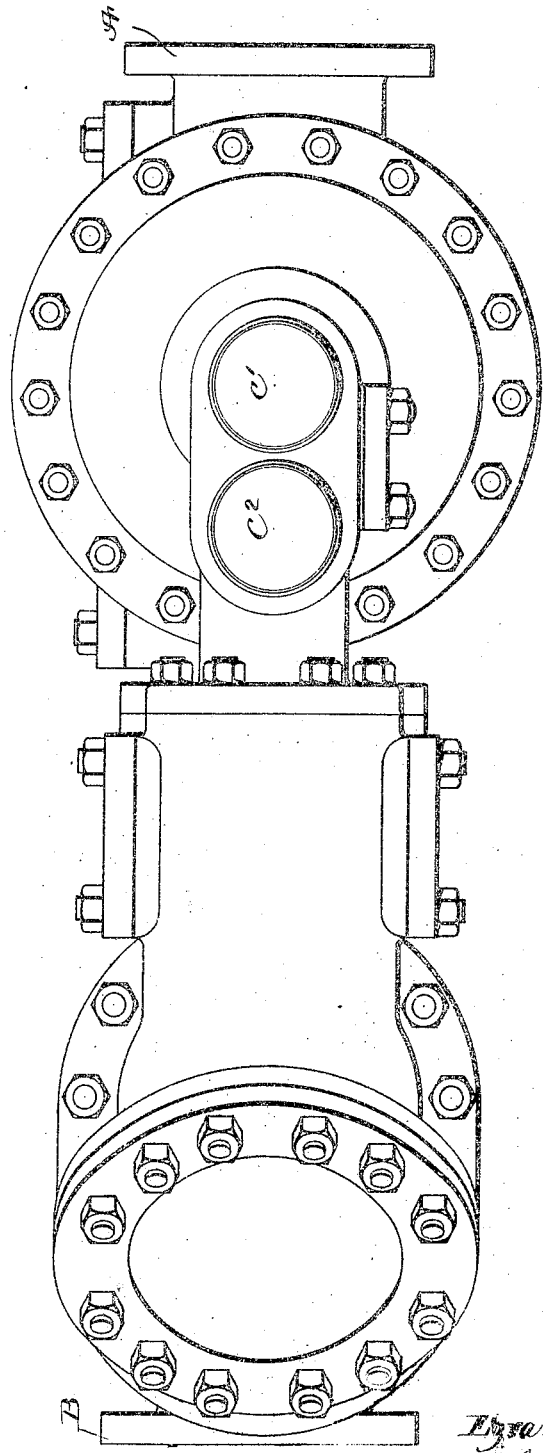

No. 887,772.

PATENTED MAY 19, 1908.

E. E. CLARK.
PROPORTIONAL METER.
APPLICATION FILED AUG. 31, 1904.

3 SHEETS—SHEET 3.

Witnesses:
W. C. Lunsford
W. D. Owen

Inventor:
Ezra E. Clark,
by Crosby & Gregory
attys.

UNITED STATES PATENT OFFICE.

EZRA E. CLARK, OF SPRINGFIELD, MASSACHUSETTS, ASSIGNOR TO CHARLES H. PHINNEY, TRUSTEE, OF CHESTNUT HILL, MASSACHUSETTS.

PROPORTIONAL METER.

No. 887,772.     Specification of Letters Patent.     Patented May 19, 1908.

Application filed August 31, 1904. Serial No. 222,792.

*To all whom it may concern:*

Be it known that I, EZRA E. CLARK, a citizen of the United States, residing at Springfield, county of Hampden, State of Massachusetts, have invented an Improvement in Proportional Meters, of which the following description, in connection with the accompanying drawing, is a specification, like letters on the drawings representing like parts.

The object of this invention is to provide a water meter that will measure and record both small and large flows within a reasonable degree of accuracy, and without interposing in the pipe line any obstructive mechanism, and without causing any loss of friction such as in either case would weaken a water service for fire fighting purposes.

In a fire service it is essential that when the full flow is turned on in case of fire the pressure shall be the maximum obtainable, and hence it is not only desirable but essential that all loss by friction in passing through the pipe shall be eliminated so far as possible, and as a corollary that no device shall be placed in the pipe which shall interfere with the flow of the water, or shall be of such nature as is liable to become clogged so as to interfere with the flow. The realization of these requirements of a fire fighting service has led to the devising of a so-called proportional meter. In this form of meter a small portion of the flow in the main pipe is shunted off through a by-pass, and the meter is located in the by-pass. By measuring the amount of water passing through the by-pass and by ascertaining the proportion which exists between the amount of water passing through the by-pass and the amount passing through the main, the entire flow of the main is known. This method eliminates all obstruction to the flow of water through the main.

While a proportional meter will measure large flows within certain limits accurately, it is found that the proportion which exists between the flow through the by-pass and the flow through the main varies at the extremes, and furthermore, it is often desirable to use comparatively small quantities of water, drawing it from the same main which is used for fire fighting purposes. The proportional meter adapted for measuring large flows is found utterly inadequate to measure proportionally small flows, and it is even possible to draw considerable quantities of water without causing the dial of the proportional meter to register at all.

It is the object of the present invention to provide a proportional meter which shall measure accurately for both small and large flows, and this is secured in the present invention by making use of a meter which shall measure accurately up to a predetermined amount sufficient for all small flows, for example, up to one hundred gallons per minute, and by causing all such small flows to pass directly through the by-pass in which this meter is located. When a larger flow is drawn the main clapper valve opens, and the same meter then acts as a proportional meter, measuring a fraction or proportion of the flow, and measuring it accurately because the fractional amount will still be within the limits of the meter. This in general is the scope and nature of the invention. It will be more fully described in the accompanying specification and drawings, and will be more particularly pointed out in the appended claims.

The drawings represent the meter of this invention in its preferred form, but it is obvious that the invention is not limited to the construction shown therein, and that many changes in arrangement, construction and even principle of operation may be made without departing from the characteristic features of the invention.

Figure 2:
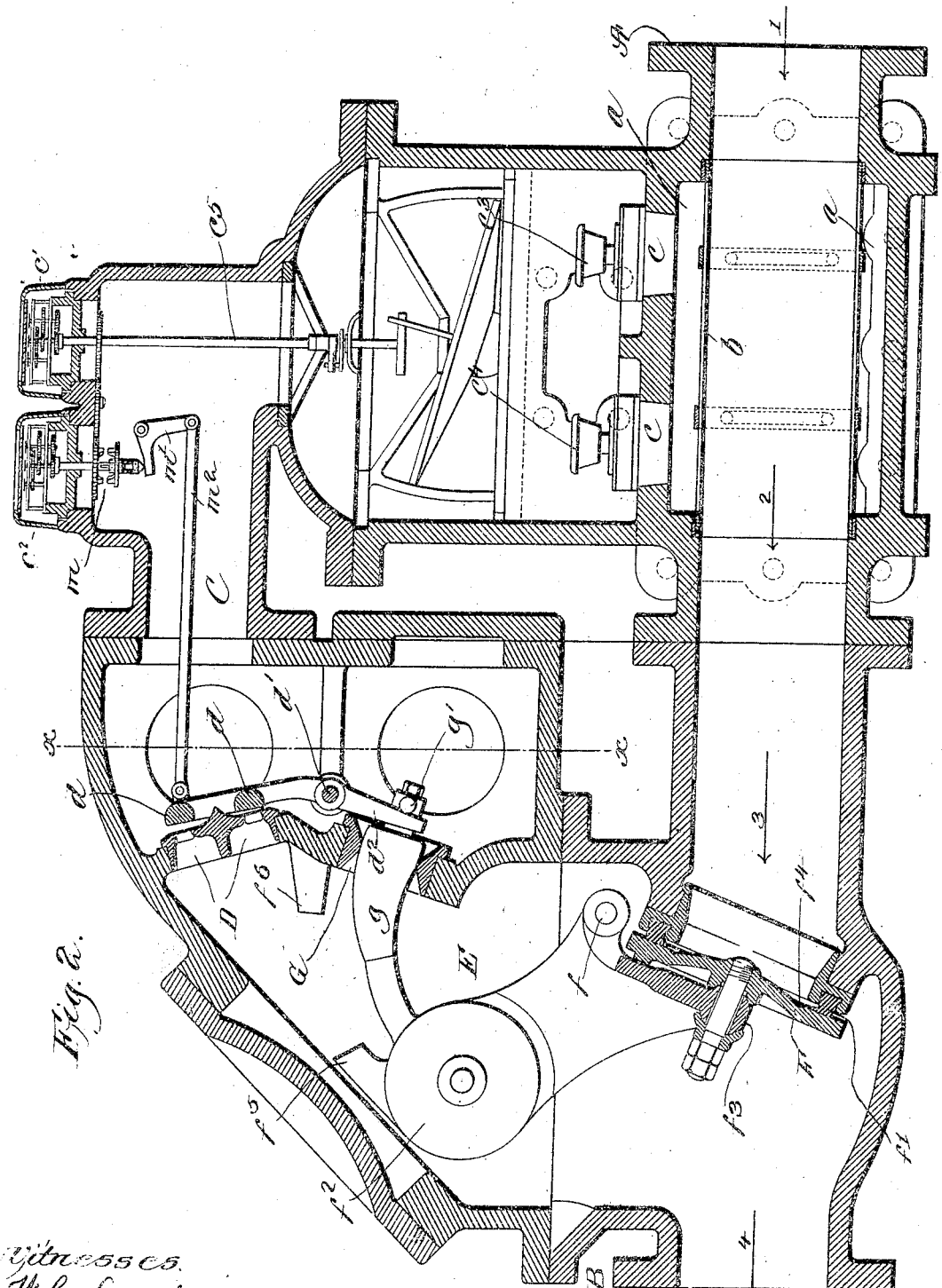
Figure 3:
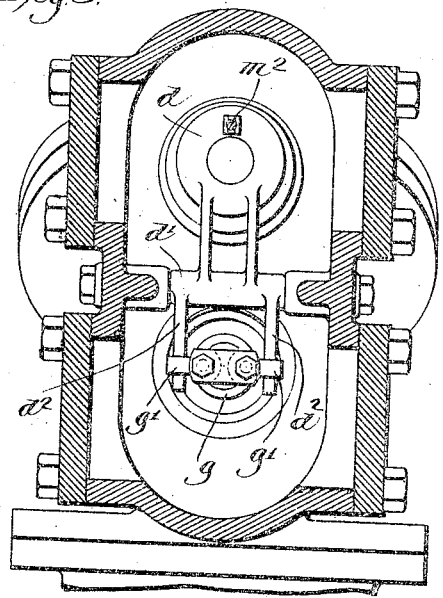
Figure 4:
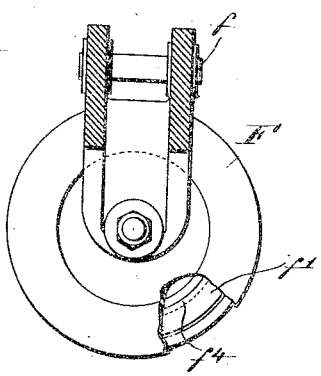

Figure 1 represents a top plan view of the preferred form of the invention, comprising all the parts that are necessary to be located in the main as a section thereof; Fig. 2 represents a central, vertical, longitudinal cross-section of the meter shown in Fig. 1; Fig. 3 is an end elevation partly in cross-section, taken on the line $x$—$x$, of Fig. 2, and showing certain valves hereinafter described; Fig. 4 is a detail view of the main clapper valve.

The meter as shown is for convenience of construction made of a number of separate castings bolted together in the usual manner. The general construction and arrangement of these castings is apparent from the drawings, and needs no further description.

The meter at its lower portion contains a section of the water main, and is adapted to be bolted into the main at A and B as a section thereof. The passage of the main flow when turned on is indicated by the arrows 1, 2, 3, 4.

The first pipe section of the meter is enlarged to form a cylindrical chamber $a$, and a cylindrical strainer $b$ forms the inner walls of this chamber, and from the chamber the openings $c$ lead into the meter. The cylindrical strainer leaves the water main entirely unobstructed since it is open at both ends, but it protects the meter from any foreign matter which might injure or prevent the operation of the meter. Furthermore, the large flow of water when it starts through the main washes clean the strainer and removes any foreign substances collected thereon.

While the cylindrical strainer is preferable for the reasons noted, any form of strainer which will not obstruct the main flow and will protect the meter from foreign matter is adapted for use in this invention.

The meter proper is shown as comprising two dials $C'$, $C^2$, but its mechanism may be of any well-known type provided that it is adapted to measure accurately and with slight friction loss small flows of water up to a predetermined amount. Experience has shown that such meters measuring flows of water up to one hundred gallons per minute accurately and with slight friction loss are now on the market and readily obtainable. Since such a meter forms no part of this invention it is not indicated herein.

The admission ports of the meter are shown at $c$, and are provided with valves $c^3$, $c^4$, of a construction which while allowing the water to pass up through the meter will prevent water from passing in the wrong direction, and thus running the meter backward. A simple form of such valve, known as a pump valve, is herein shown.

The water after passing into the meter through the ports $c$, $c$, operates the works in the usual manner, whereby the dial operating shaft $c^5$ is revolved to cause the dial $C'$ to register. The water then passes on through the by-pass C, through the valve D into the chamber E, and out through the main, as indicated by the arrow 4.

Located in the main is a weighted clapper valve F, so arranged as not to open until a predetermined flow has been reached. The amount of the flow upon which the clapper valve F is to open is determined by the upper limit of accuracy of registration of the meter, or by the upper limit of the amounts of the average small flows. As before stated one hundred gallons per minute has been taken as a fair amount.

With the clapper valve F closed and small flows being drawn through the main, the water enters at the arrow 1, passes through the by-pass C in which the meter is located, and by which it is measured, and then out around the clapper valve F, through the main. In this way all small flows are measured accurately and with slight friction loss.

When the pressure exceeds the predetermined amount and the flow has reached a predetermined extent of say one hundred gallons per minute, the main clapper valve F opens and the flow is directed through the main as indicated by the arrows 1, 2, 3, 4.

The clapper valve F is pivoted at $f$ so as to rest by gravity upon the valve-seat $f'$, and is weighted as at $f^2$, sufficiently to remain so seated until the predetermined flow or pressure takes place.

The weight is so arranged that its effect decreases as the valve clapper opens, so that the loss in friction decreases correspondingly. The friction loss in fact is dependent upon the moment of the weight, and since when the valve clapper is wide open the weight approaches the vertical position above the pivot $f$, the moment becomes smaller.

To secure the accurate setting of the valve F upon its seat $f'$ regardless of any slight inequalities in construction, the valve F is attached to its weighted support by a universal joint $f^3$. In addition the valve seat proper $f'$ is composed of rubber having a thin annular interior elastic flange $f^4$. This flange insures the valve clapper remaining tight during all small flows through the by-pass, because owing to the slight difference in pressure between the two sides of the clapper this flange or lip will be kept pressed up against the face of the clapper until the clapper opens sufficiently to tear it loose entirely. Thus the valve remains tight during all conditions previous to a positive and definite opening of the valve, and this feature is regarded as a novel and important feature of this invention, although of course not essential to the invention in its broad aspect.

When the main clapper valve F opens its action serves to clutch or throw into gear the registering mechanism of the dial $C^2$ of the meter, which serves to register proportionally the flow through the main pipe.

The flow of water through the by-pass in which the meter is located will, upon the opening of the main clapper valve F drop at once from the maximum flow through the by-pass down to a small fraction of the minimum flow through the main pipe, or in other words to a small fraction of the maximum flow through the by-pass because the maximum flow through the by-pass and the minimum flow through the main pipe are presumed to be equal upon the opening of the main clapper valve F. Experience has also shown that while the main clapper valve F is opening from the position at which the minimum flow begins to its wide open position, and the main flow is consequently increasing from its minimum amount to its maximum, or while any variation is taking place in the main flow the flow through the by-pass is not strictly proportional to the varying main flow. In view of these facts it becomes necessary to vary the size of the exit opening of the by-pass as the main clapper valve opens and closes so as to maintain a constant proportion between the flow through the by-pass and through the main pipe. As one means of securing a substantially accurate registration of the main flow on the dial C', the following construction has been designed.

An additional opening G is provided as an exit from the by-pass C, and a conoidal valve $g$ is provided for this opening. This conoidal valve is arranged to operate simultaneously with the main clapper valve F, and as a preferable means of securing this end it is shown attached to the support of the clapper valve F and with its axis formed on the arc of a circle having its center at the pivot $f$ of the main valve clapper. When the main valve clapper F is closed the conoidal valve $g$ closes the port G. This conoidal valve $g$ is so shaped as determined by experiment and calculation that the flow through the main pipe when the valve clapper F is open will be proportional to the flow through the by-pass C when the port G is correspondingly opened. When the main valve clapper F is opened and simultaneously the valve $g$ opens the port G to secure the proportional flow, it is of course necessary simultaneously to close the port D. This port is shown as annular and designed to pass a considerable flow of water when its valve is but slightly open. The valve $d$ is shown as pivoted at $d'$ on the frame and provided with projecting arms $d^2$, engaging a pin $g'$ projecting from the conoidal valve $g$. When the main valve clapper F is closed the pin $g'$ acting through the lever arm $d^2$ serves to hold the valve $d$ open against the pressure of the water, but when the main valve clapper F is opened at the same time the port G is opened simultaneously and the valve $d$ is closed, and the water is thus shunted in the by-pass from the port D through the port G.

The construction of the valve $d$ with the projecting arms $b^2$ between which the conoidal valve passes in its opening movement renders impossible any blocking of the opening of the main valve F due to clogging of the valve opening D. Hence, even if an accumulation should prevent the closing of valve $d$ the main check valve would still open freely, and in case of fire it is the one essential thing that the main valve open promptly under all conditions.

As already stated the dial $C^2$ of the meter must be thrown into operation simultaneously with the opening of the main valve clapper. This is secured in the construction illustrated by a simple form of clutch $m$ operated by a bell-crank lever $m'$ connected by a link $m^2$ with the valve $d$.

The limit of the opening of the main clapper valve may be determined by stops $f^5, f^6$, one located on the valve clapper support and the other on the frame.

The operation of the meter when measuring proportionally with the dial $C^2$ is apparent from the foregoing description. When the predetermined pressure, as for example one hundred gallons per minute, is reached, in the main pipe, the clapper F is thrown open, the port D is at once closed, the port G opened, and the flow through the by-pass shunted from the port D to the port G. At the same time the dial $C^2$ is thrown into operation by the clutch M, and during the continued opening of the valve clapper F the proportion between the flow in the by-pass and the flow in the main is maintained by the conoidal valve $g$.

When the opening of the main valve takes place the meter is already running registering on the dial C' the flow through the by-pass, and consequently the meter does not have to be cleaned out and started, but merely drops to a slower movement owing to the fall of water flowing through the by-pass, and the dial $C^2$ being thrown into gear the registration begins on dial $C^2$ and continues on dial C'.

To ascertain the amount of water passing through the meter it is only necessary to take readings of the two dials C' and $C^2$ and add them together, for the dial C' indicates the amount of water actually passing through the by-pass, and the dial $C^2$ (when properly multiplied by the coefficient indicating the proportion of the flow through the by-pass to the flow in the main pipe) indicates the amount of water passing through the main pipe. Thus not only will the total quantity that is passed be registered but it will also be possible to determine in a manner the rate of the draft upon the supply. If dial C' shows considerable change since the last reading it will be evident that only small flows have been used, from time to time, but if dial $C^2$ shows considerable change it will be evident that flows of something over the predetermined amount herein referred to as one hundred gallons per minute have been drawn, and this information often is of considerable importance.

Having described my invention, what I claim as new and desire to secure by Letters Patent, is:—

1. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means acting simultaneously with the opening of the check-valve to close the first exit port, open the second exit port and connect the second registering means and the measuring device.

2. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means acting simultaneously with the opening of the check-valve to close the first exit port, open the second exit port and connect the second registering means and the measuring device, means to secure a substantially constant proportional flow through the second exit port and the main.

3. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means actuated during the time the check-valve is open to maintain the first exit port closed, the second exit port open, the measuring device and the second registering means connected, and a substantially constant proportional flow through the second exit port and the main.

4. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means connected with, and operated by the opening movement of, the check-valve to close the first exit port, open the second exit port, and connect the second registering means and the measuring device simultaneously with the opening of the check-valve.

5. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means connected with, and operated by the opening movement of, the check-valve and acting simultaneously therewith to close the first exit port, open the second exit port, and connect the second registering means and the measuring device, means to secure a substantially constant proportional flow through the second exit port and the main.

6. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means connected with and controlled by the check-valve to maintain the first exit port closed, the second exit port open, the measuring device and the second registering means connected, and a substantially constant proportional flow through the second exit port and the main while the check-valve is open.

7. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, a conoidal valve for the second exit port constructed to secure a substantially constant proportional flow through the second exit port and the main, means acting simultaneously with the opening of the check-valve to close the first exit port, open the conoidal valve in the second exit port, and connect the second registering means and the measuring device.

8. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, a conoidal valve for the second exit port constructed to secure a substantially constant proportional flow through the second exit port and the main, means connected with and operated by the opening movement of the check-valve and acting simultaneously therewith to close the first exit port, open the conoidal valve in the second exit port, and connect the second registering means and the measuring device.

9. A water meter comprising a water main, a check-valve therein, a weight connected with the said check-valve and acting to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means acting simultaneously with the opening of the check-valve to close the first exit port, open the second exit port, and connect the second registering means and the measuring device.

10. A water meter comprising a water main, a check-valve therein, a weight connected with the said check-valve and acting to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, a conoidal valve for the second exit port constructed to secure a substantially constant proportional flow through the second exit port and the main, means acting simultaneously with the opening of the check-valve to close the first exit port, open the conoidal valve in the second exit port, and connect the second registering means and the measuring device.

11. A water meter comprising a water main, a check-valve therein, a weight connected with the said check-valve and acting to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, a conoidal valve for the second exit port constructed to secure a substantially constant proportional flow through the second exit port and the main, means connected with and operated by the opening movement of the check-valve and acting simultaneously therewith to close the first exit port, open the conoidal valve in the second exit port and connect the second registering means and the measuring device.

12. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means acting simultaneously with the opening of the check-valve to close the first exit port, open the second exit port and connect the second registering means and the measuring device, means to prevent any backward flow from the by-pass to the main.

13. A water meter comprising a water main, a check-valve therein, means to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, means connected with, and operated by the opening movement of, the check-valve and acting simultaneously therewith to close the first exit port, open the second exit port, and connect the second registering means and the measuring device, means to prevent any backward flow from the by-pass to the main.

14. A water meter comprising a water main, a check-valve therein, a weight connected with the said check-valve and acting to prevent the opening of said check-valve prior to a predetermined flow in the main, a by-pass around the said check-valve provided with two exit ports, a measuring device located in said by-pass and provided with two registering means, said measuring device causing the operation of the first registering means to register the water passing through the by-pass, a conoidal valve for the second exit port constructed to secure a substantially constant proportional flow through the second exit port and the main, means connected with, and operated by the opening movement of, the check-valve and acting simultaneously therewith to close the first exit port, open the conoidal valve in the second exit port and connect the second registering means and the measuring device, means to prevent any backward flow from the by-pass to the main.

15. A water meter comprising a water main, a check valve therein, a pivoted support for said check valve, a weight connected with said pivoted support and arranged so that when the valve opens the moment of the weight decreases, a by-pass around the said check valve provided with two exit ports, the first of which is ring-shaped and provided with a ring-shaped valve, and the second of which is provided with a conoidal valve, a measuring device located in said by-pass and provided with two dials, means for causing the operation of the first dial to register the water passing through the by-pass, means connected with and operated by the check valve to close the ring-shaped valve of the first exit port and open the second exit port through the conoidal valve simultaneously with the opening of the check valve, means for simultaneously connecting the second dial with the means for causing the operation of the first dial.

16. A water meter comprising a water main, a check valve therein, a pivoted support for said check valve, a weight connected with said pivoted support and arranged so that when the valve opens the moment of the weight decreases, a by-pass around the said check valve provided with two exit ports, the first of which is ring-shaped and provided with a ring-shaped valve, and the second of which is provided with a conoidal valve, a measuring device located in said by-pass and provided with two dials, means for causing the operation of the first dial to register the water passing through the by-pass, means connected with and operated by the check valve to close the ring-shaped valve of the first exit port and open the second exit port through the conoidal valve simultaneously with the opening of the check valve, means for simultaneously connecting the second dial with the means for causing the operation of the first dial, means to prevent any backward flow from the by-pass to the main.

17. A water meter comprising a main, a check valve therein, a by-pass around the said check valve, means for measuring directly small flows through the by-pass, means for measuring proportionally by the flow through the by-pass large flows through the open check valve.

18. A water meter comprising a main, a check valve therein, a by-pass around the said check valve, means for measuring directly small flows through the by-pass, means for measuring proportionally large flows through the open check valve by the flow through the by-pass, a conoidal valve in the by-pass for maintaining the desired proportion between the flows through the by-pass and the main.

19. A water meter comprising a main, a check valve therein, a by-pass around the said check valve, means for measuring directly small flows through the by-pass, means for measuring proportionally large flows through the open check valve by the flow through the by-pass, a conoidal valve in the by-pass for maintaining the desired proportion between the flows through the by-pass and the main, means for causing the simultaneous actuation of the check and conoidal valves.

20. A water meter comprising a main, a check valve therein, a by-pass around the said check valve, means for measuring directly small flows through the by-pass and for measuring proportionally large flows through the open check valve by the flow through the by-pass, a conoidal valve in the by-pass for maintaining the desired proportion between the flows through the by-pass and the main, means for causing the simultaneous actuation of the check and conoidal valves during the opening movement of the check valve.

21. A water meter comprising a main, a check valve therein, a by-pass around the said check valve, means for measuring directly small flows through the by-pass and for measuring proportionally large flows through the open check valve by the flow through the by-pass, a conoidal valve in the by-pass for maintaining the desired proportion between the flows through the by-pass and the main, means for causing the simultaneous actuation of the check and conoidal valves during the closing movement of the check valve.

22. A water meter comprising a main, a check valve therein, a by-pass around the said check valve, a conoidal valve in said by-pass for maintaining a desired proportion between the flows through the main and the by-pass when the check valve is open, means for measuring directly small flows through the by-pass when the check valve is closed, means for measuring proportionally by the flow through the by-pass large flows through the open check valve.

23. A water meter comprising a main, a check valve therein, a by-pass around the said check valve, an axially curved, pivoted conoidal valve for said by-pass, connections between said check valve and conoidal valve whereby a desired proportion is maintained between the flows through the main and the by-pass when the check valve is open.

24. A water meter comprising a main, a check valve therein, a by-pass around the said check valve, an axially curved, pivoted conoidal valve for said by-pass, connections between said check valve and conoidal valve to cause the simultaneous but reverse operation of the said valves whereby a desired proportion is maintained between the flows through the main and the by-pass when the check-valve is open.

25. A water meter comprising a main, a check valve therein, a by-pass around the said check valve, an axially curved, pivoted conoidal valve for said by-pass, connections between said check valve and conoidal valve whereby a desired proportion is maintained between the flows through the main and the by-pass when the check valve is open, means for measuring directly small flows through the by-pass, means for measuring proportionally by the flow through the by-pass large flows through the open check valve.

26. A water meter comprising a main, a check valve therein, a by-pass around the said check valve, an axially curved, pivoted conoidal valve for said by-pass, connections between said check valve and conoidal valve whereby a desired proportion is maintained between the flows through the main and the by-pass when the check valve is open, a measuring device located in said by-pass and provided with two registering means, one of which is operated by the flow through the by-pass when the check-valve is closed and the other of which is operated by the flow through the by-pass only when the check valve is open.

27. A water meter comprising a main, a check valve therein, a by-pass around the said check valve, an axially curved, pivoted conoidal valve for said by-pass, connections between said check valve and conoidal valve whereby a desired proportion is maintained between the flows through the main and the by-pass when the check valve is open, a measuring device located in said by-pass and provided with two registering means, one of which is operated by the flow through the by-pass when the check-valve is closed, and the other of which is operated by the flow through the by-pass only when the check valve is open, connections between said measuring device and said check-valve for throwing the second registering means into and out of operation upon the opening and closing respectively of the check valve.

28. A water meter comprising a main, a check valve therein, means to prevent the opening of said check valve prior to a predetermined flow through the main, a by-pass around the said check valve, a measuring device located in said by-pass and provided with two registering means, means for causing the operation of the first registering means to register the flow passing through the by-pass, means acting when the check valve is open for causing the operation of the second registering means to register the proportional flow passing through the main by the flow through the by-pass.

29. A water meter comprising a main, a check valve therein, means to prevent the opening of said check valve prior to a predetermined flow through the main, a by-pass around the said check valve, a measuring device located in said by-pass and provided with two registering means, means for causing the operation of the first registering means to register the flow passing through the by-pass, means acting when the check valve is open for causing the operation of the second registering means to register the proportional flow passing through the main by the flow through the by-pass, means to secure a desired proportion between the flows through the main and by-pass when the check-valve is open, comprising a conoidal valve in the by-pass.

30. A water meter comprising a main, a check valve therein, means to prevent the opening of said check valve prior to a predetermined flow through the main, a by-pass around the said check valve, a measuring device located in said by-pass and provided with two registering means, means for causing the operation of the first registering means to register the flow passing through the by-pass, means acting when the check valve is open for causing the operation of the second registering means to register the proportional flow passing through the main by the flow through the by-pass, means to secure a desired proportion between the flows through the main and by-pass when the check valve is open, comprising an axially curved pivoted conoidal valve in the by-pass connected to the check valve to move therewith.

31. A water meter comprising a main, a check valve therein, a by-pass around said check valve, a measuring device, comprising two registering means, means controlled by the check valve for controlling the operation of one of said registering means.

32. A water meter comprising a main, a check-valve therein, a by-pass around said check valve, a measuring device comprising two registering means, connections between the check valve and said measuring device for controlling the operation of one of said registering means when the check valve is open.

33. A water meter comprising a main, a check valve therein, a by-pass around said check valve, a measuring device comprising two registering means, means for operating both of said registering means by the flow through the by-pass, connections between the check valve and one of said registering means, whereby the operation of one of said registering means is permitted upon the opening of the check valve, and is prevented upon the closing of the check-valve.

In testimony whereof, I have signed my name to this specification, in the presence of two subscribing witnesses.

EZRA E. CLARK.

Witnesses:
NATHAN HEARD,
MABEL PARTELOW.